No. 622,969. Patented Apr. 11, 1899.
J. N. MURPHY.
VALVE.
(Application filed Mar. 4, 1898.)
(No Model.)
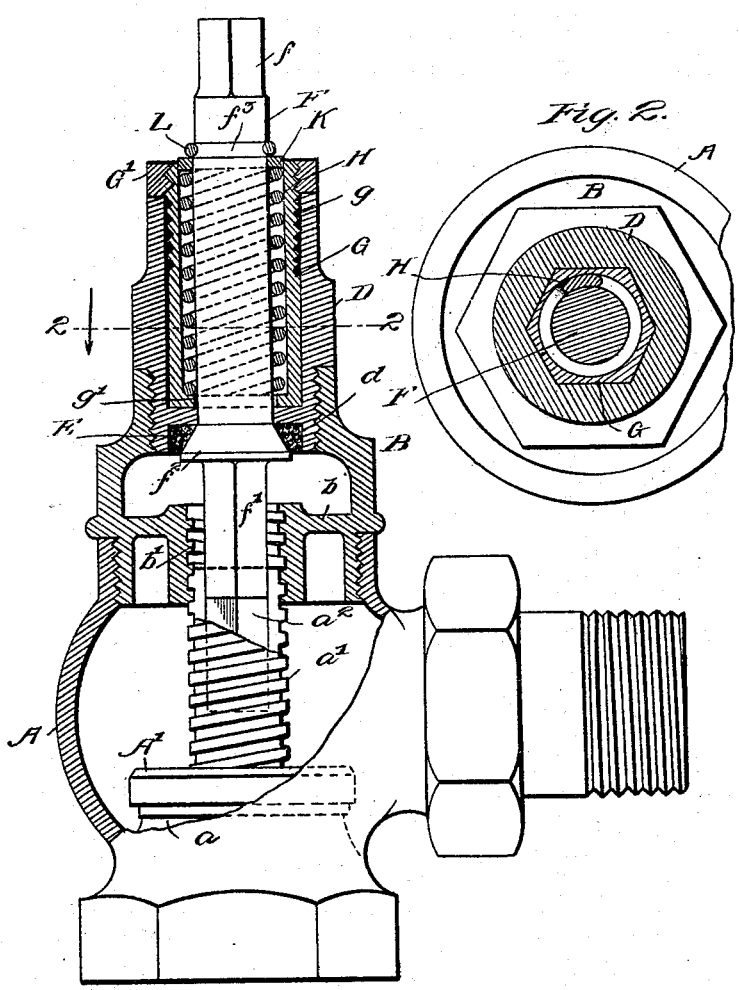
Witnesses
Inventor
John N. Murphy
by N. DuBois,
Attorney.

UNITED STATES PATENT OFFICE.

JOHN N. MURPHY, OF SPRINGFIELD, ILLINOIS.

VALVE.

SPECIFICATION forming part of Letters Patent No. 622,969, dated April 11, 1899.

Application filed March 4, 1898. Serial No. 672,587. (No model.)

*To all whom it may concern:*

Be it known that I, JOHN N. MURPHY, a citizen of the United States, residing at Springfield, in the county of Sangamon and State of Illinois, have invented certain new and useful Improvements in Valves, of which the following is such a full, clear, and exact description as will enable others skilled in the art to which it appertains to make and use my said invention.

My invention relates to valves of that class in which the pressure of steam or liquid within the valve serves to cause the valve to rest firmly on its seat.

The purposes of my invention are to provide a valve so constructed and arranged that the valve in the valve-bonnet may be removed while the valve in the valve-body is in place on its seat without unseating the valve in the valve-body and to provide simple and effective means whereby the valve in the valve-bonnet may be supported in such manner that it will automatically adjust itself to the expansion or contraction of the metal of the valve, thereby avoiding leakage which in valves as ordinarily constructed arises from changes in temperature and unequal contraction and expansion of the parts of the valve.

With these ends in view my invention consists in certain novel features of construction and combinations of parts shown in the annexed drawings, to which reference is hereby made, and hereinafter particularly described, and pointed out in the claims.

Referring to the drawings, Figure 1 is a vertical axial section through a valve embodying my improvements. Fig. 2 is a horizontal transverse section on the line 2 of Fig. 1.

Similar letters of reference designate like parts in both views.

The valve-body A, which may be of any suitable or convenient form, has an internal valve-seat $a$, of the usual well-known form. The valve-bonnet B has an internal web $b$ and a female screw $b'$ integral with said web. The bonnet B screws into the valve-body A in the usual manner.

An extension D, which is cylindrical in its lower part and hexagonal in its upper part, screws into the upper end of the valve-bonnet B. In the lower extremity of the extension D is a circular recess $d$, in which a packing-ring E, of bronze, composition metal, or other suitable material, fits.

Within the valve-body is a valve A′, which seats on the seat $a$ and has a screw-threaded stem $a'$, which works in the female screw $b'$. In the screw $a'$ is a square longitudinal recess $a^2$, in which the squared lower end $f'$ of the valve-stem fits. The valve-stem F is squared at its upper and lower extremities $f$ and $f'$, respectively, and the intermediate part of the stem is cylindrical. At the upper end of the squared part $f'$ is an integral conical enlargement $f^2$, which fits in and seats on the packing-ring E, as clearly shown in Fig. 1.

The inner surface of the extension D is hexagonal in form, as clearly shown in Fig. 2. A hexagonal sleeve G fits in the hexagonal bore of the extension D and is threaded in its upper part, as shown at $g$. In the lower end of the sleeve G is a hole $g'$, through which the valve-stem passes. A coiled spring H surrounds the stem F and fits in the bore of the sleeve G, and the lower end of said spring abuts against the bottom of the bore. A nut G′ screws on the upper part of the sleeve G. A washer K fits in the bore of the sleeve G and surrounds the valve-stem. A groove $f^3$ runs around the valve-stem above and contiguous to the upper end of the sleeve G. A ring L fits in the groove $f^3$, bears on the washer K, and serves to prevent upward movement of the washer on the stem.

By reason of the peculiar construction and arrangement of parts shown and described the spring H serves to keep the conical part F² of the valve-stem always firmly seated on the packing-ring E regardless of changes in temperature or contraction or expansion of the metal of the valve. Should the spring H become weakened by use, it is only necessary to turn the nut G′, so as to draw the sleeve upward, thereby increasing the tension of the spring in an obvious manner.

The sleeve G being externally hexagonal in form and fitting in the hexagonal bore of the extension D cannot turn in the extension; but the stem F is free to turn within the sleeve G.

Having fully described my invention, what I claim as new, and desire to secure by Letters Patent, is—

1. An extension having a recess in its lower end; a packing-ring fitting in said recess; a sleeve slidable within said extension; a valve-stem passing through said sleeve, having its lower end squared and having a conical enlargement seating on said packing-ring; a spring surrounding said valve-stem means to prevent upward movement of said spring and means for adjusting said sleeve; in combination with a valve-body, and a valve within said valve-body having a stem provided with a square hole in which the squared part of said first-named stem fits; as set forth.

2. An extension for valves, consisting of a member, such as D, adapted to be detachably connected with a valve-body and having in its lower extremity a recess adapted to receive a packing-ring, also having a hexagonal bore; a sleeve fitting in said hexagonal bore and screw-threaded at its upper end; a spring within said sleeve; a nut screwing on said sleeve and abutting against the upper end of the member D; and a washer fitting in said sleeve; in combination with a valve-stem having an enlargement adapted to seat on said packing-ring and having an annular channel; and a ring fitting in said channel, in juxtaposition to said washer as set forth.

In witness whereof I have hereunto subscribed my name, at Springfield, Illinois, this 22d day of February, A. D. 1898.

JOHN N. MURPHY.

Witnesses:
MABEL ALLEN,
M. A. JONES.